United States Patent [19]

Iwamatsu et al.

[11] Patent Number: 4,859,634

[45] Date of Patent: Aug. 22, 1989

[54] PROCESS FOR PRODUCTION OF VITREOUS CERAMICS AND PRODUCT THEREOF

[75] Inventors: Motoshige Iwamatsu; Mitsugu Kaji, both of Kanazawa, Japan

[73] Assignee: Photon Ceramics Kabushiki Kaisha, Japan

[21] Appl. No.: 95,458

[22] Filed: Sep. 11, 1987

[30] Foreign Application Priority Data

Sep. 12, 1986 [JP] Japan ................................ 61-214047
Jul. 30, 1987 [JP] Japan ................................ 62-188856

[51] Int. Cl.$^4$ ........................ C03C 10/16; C03C 6/06
[52] U.S. Cl. ........................................ 501/3; 501/30; 501/43; 501/59; 501/151
[58] Field of Search ................... 501/3, 30, 59, 43, 151

[56] References Cited

U.S. PATENT DOCUMENTS 3,689,293 9/1972 Beall ......................................... 501/3
3,801,295 4/1974 Beall et al. ............................. 501/59

Primary Examiner—William R. Dixon, Jr.
Assistant Examiner—Anthony J. Green
Attorney, Agent, or Firm—Lowe, Price, Leblanc, Becker & Shur

[57] ABSTRACT

A complex oxide comprising zirconium oxide and an oxide of at least one metal selected from the group consisting of an alkali metals, alkaline earth metals, silicon and lead is mixed with pottery stone, magnesium fluoride, a compound capable of forming magnesium oxide, a compound capable of forming potassium oxide and a compound capable of forming boron oxide to obtain a composition in which the contents of elements in 100 parts by weight of the total amount exclusive of the ignition loss are 16 to 25 parts of silicon, 6 to 9 parts of aluminum, 5.5 to 12 parts of potassium, 4.7 to 15 parts of magnesium, 0.7 to 5.0 parts of zirconium, 0.7 to 3.2 parts of boron, 3.0 to 9.3 parts of fluorine, up to 7.0 parts of metals other than the foregoing elements, and the balance being oxygen. This composition is heat-melted and then cooled from a temperature higher at least 50° C. than the glass transition temperature of a vitreous body to be formed to a temperature lower by at least 70° C. lower than the transition temperature at a cooling speed lower than 100° C. per hour, and the resulting vitreous body is heated-treated at a temperature of 1100° to 1360° C. in a closed vessel. According to this process, the crack ratio can be drastically reduced and the yield can be increased even when a large vitreous ceramic product is prepared, and the mechanical strength and machinability are highly improved in the obtained product.

17 Claims, No Drawings

PROCESS FOR PRODUCTION OF VITREOUS CERAMICS AND PRODUCT THEREOF

BACKGROUND OF THE INVENTION (1) Field of the Invention

The present invention relates to a process for the production of machinable vitreous ceramics suitable for machine parts and the like.

(2) Description of the Prior Art

Crystallized vitreous ceramics are often used as one of ceramic materials for mechanical or electrical parts. As the vitreous ceramics of this type, there is known a vitreous ceramic article in which at least 50% by volume of a crystal of a fluormica is dispersed, as disclosed in Japanese Patent Publication No. 34775/79. This vitreous ceramic is prepared by melting the starting composition to effect vitrification and crystallizing a fluormica crystal and contains fine crystals randomly, and the vitreous ceramics is nonpermeable and is easily machined by cutting or the like. However, the vitreous ceramics is too low in mechanical strength and is defective in that cracks are formed during the step of forming a vitreous body and the yield is therefore reduced.

Furthermore, Japanese Patent Application Laid-Open Specification No. 72654/86 discloses a process in which a fluorine-containing mixture comprising pottery stone as the main material in melted and the obtained vitreous body and an easily gasifiable fluorine compound are heated at 1100° to 1360° C. in a closed vessel to crystallize fluormica in the vitreous formed body. According to this process, crystallized vitreous ceramics can be obtained in a short time, but formation of cracks during the step of forming a vitreous body is not substantially eliminated and the strength is not substantially improved.

The above-mentioned conventional fluormica-containing vitreous ceramics can be machined by cutting or the like and have an appropriate mechanical strength, and when a small product is prepared by using these ceramics, no particular problem arises but when it is intended to prepare a large product (having a size of 15 cm×15 cm×3 cm or a larger size), cracks are often formed in the vitrified formed body (hereinafter referred to as "vitreous body") and the yield is reduced. Furthermore, it is desirable that the strength be improved. However, if the starting material composition and the preparation conditions are so selected that the strength is improved, the machinability is reduced.

SUMMARY OF THE INVENTION

It is therefore a primary object of the present invention to solve the foregoing problems involved in the conventional technique and provide a process capable of providing large vitreous ceramic bodies good machinability and sufficient mechanical strength in a high yield.

In accordance with the present invention, this object can be attained by a process for the production of vitreous ceramics, which comprises the step of preparing a mixture composed of pottery stone, magnesium fluoride, a compound capable of forming magnesium oxide, a compound capable of forming potassium oxide, a compound capable of forming boron oxide and a complex dioxide comprised of zirconium oxide and an oxide of at least one metal selected from the group consisting of alkali metals, alkaline earth metals, silicon and lead to obtain the composition in which the contents of elements in 100 parts by weight of the total amount exclusive of the ignition loss are 16 to 25 parts of silicon, 6 to 9 parts of aluminum, 5.5 to 12 parts of potassium, 4.7 to 15 parts of magnesium, 0.7 to 5.0 parts of zirconium, 0.7 to 3.2 parts of boron, 3.0 to 9.3 parts of fluorine and up to 7.0 parts of metals other than the foregoing elements and the balance being oxygen, heat-melting the composition, then gradually cooling the melt from a temperature higher by at least 50° C. than the transition temperature of a vitreous body to be formed to a temperature lower by at least 70° C. than said temperature at a cooling speed lower than 100° C. per hour to obtain a vitreous body, and the step of heat-treating the vitreous body at a temperature in the range of from 1100° C. to 1360° C. in a closed vessel.

DETAILED DESCRIPTION OF THE PREFERRED EMBODIMENTS

According to the present invention, the target vitreous ceramics are prepared from the starting composition including pottery stone, appropriate compounds capable of forming magnesium oxide, potassium oxide and boron oxide, respectively, and a complex oxide composed of zirconium dioxide and an oxide of at least one metal selected from the group consisting of alkali metals, alkaline earth metals, silicon and lead.

Pottery stone is a mineral comprising a complex oxide composed of silica, alumina and potassium oxide as the main component. Use of pottery stone having a high purity, in which the content of impurities is as low as possible, is preferred. By using pottery stone including the foregoing components, the melting is expedited and promoted and fine crystals can be easily formed. In the present invention, melting is performed to obtain a homogeneous solution by heating the above-mentioned starting composition. The amount used of pottery stone is such that in 100 parts by weight of the total amount of the composition exclusive of the ignition loss (hereinafter referred to as "100 parts by weight of the composition"), aluminum is contained in an amount of 6 to 9 parts and silica, inclusive of silica contained in other components, is contained in an amount of 16 to 25 parts. If the amount of pottery stone is adjusted within this range, crystallization suitable for facilitating machining is attained.

Magnesium fluoride is incorporated in such an amount that the fluorine content is 3.0 to 9.3 parts per 100 parts by weight of the composition. Magnesium oxide per se and magnesium compounds which form magnesium oxide by decomposition under heating, such as magnesium hydroxide, can be used as the magnesium compound capable of forming magnesium oxide. The magnesium compound capable of forming magnesium oxide is used in such an amount that the content of magnesium, inclusive of magnesium of magnesium fluoride, is 4.7 to 15 parts by 100 parts by weight of the composition.

As the potassium compound capable of forming potassium oxide, there can be used potassium oxide per se and compounds which form potassium oxide by decomposition under heating, such as potassium carbonate and potassium borate. Other potassium compounds can be similarly used, so far as the composition of the starting material is not substantially influenced. The potassium compound is used in such an amount that the content of potassium, inclusive of potassium contained in other components, is 5.5 to 12 parts per 100 parts by weight of the composition. If the amount of the potassium compound is adjusted within this range, melting is facilitated and promoted and an appropriate degree of crystallization is attained.

As the compound capable of forming boron oxide, there can be used boron oxide per se and compounds which form boron oxide by decomposition under heating, such as boric acid and potassium borate. Other boron compounds can be similarly used, so far as the composition of the starting material is not substantially influenced. The boron compound is incorporated in such an amount that the boron content is 0.7 to 3.2 parts per 100 parts by weight of the composition. If the boron content is adjusted within this range, melting is facilitated and promoted and a good glass formability is attained.

As the complex oxide composed of zirconium dioxide and an oxide of at least one metal selected from the group consisting of alkali metals, alkaline earth metals, silicon and lead, there can be used zirconic acid salts obtained by melting an oxide, a hydroxide or a carbonate of the above-mentioned metal and zirconium oxide, such as lithium zirconate, potassium zirconate, calcium zirconate, barium zirconate, lead zirconate, or zircon which is a complex oxide composed of silicon dioxide and zirconium dioxide. In the case where zirconia alone or a mixture of zirconia and other metal oxide is used, zirconia is hardly or only slightly dissolved and the intended effect of the present invention cannot be attained.

Accordingly to the present invention, by incorporating a zirconium compound in the form or a complex oxide, the starting composition is promptly dissolved and a homogeneous vitreous body is obtained, and a crack forming ratio is drastically reduced in the process for preparing a large vitreous body. Furthermore, by the heat treatment, two types of homogeneous fine crystals composed of fluormica and zirconia can be easily formed and the machinability as well as the mechanical strength is effectively improved. 0.7 to 5.0 parts per 100 parts by weight of the composition. If the zirconium content is lower than 0.7 part, no sufficient effect can be attained, and if the zirconium content exceeds 5.0 parts, the zirconium compound, is not completely dissolved and the undissolved zirconium compound adversely influences the quality.

Alkali metal or alkaline earth metals or other metals contained in the complex oxide which are not mentioned in the foregoing may be contained in a total amount of up to 7 parts per 100 parts by weight of the composition, so far as the properties of the obtained vitreous ceramics are not susbtantially degraded. However, if the total content of such metals exceeds 7 parts, the machinability is degraded and no good results can be obtained.

The starting composition comprising the above-mentioned components are sufficiently pulverized and blended and is then melted in a high-temperature furnace to obtain a melt having a glass transition temperature of from about 600° to 680° C. This melt is cast in a mold and is gradually cooled from a temperature higher by at least 50° C. than the transition temperature, for example, 730° C. to a temperature lower by at least 70° C. than the transition temperature, for example, 530° C., at a cooling speed lower than 100° C. per hour, whereby the melt is solidified and a vitreous body is obtained. If the cooling speed is too high, the internal strain is increased in the obtained vitreous body, and if it is intended to prepare a large vitreous body, cracks are formed and the yield is reduced. Furthermore, if the cooling speed is too low, the quality or yield of the vitreous body is not degraded, but the productivity with respect to the time factor is reduced.

The obtained vitreous body is heat-treated at 1100 to 1360° C. in a vessel. If the vessel is opened, the vapor of the fluorine compound escapes. Therefore, the vessel should be closed so that votalized fluorine compound from the surface of the vitreous body can be controlled to a minimum level. If a small amount of a volatile fluorine compound, for example, magnesium fluoride, is incorporated in the vessel, the volatilization of the fluorine compound from the vitreous body can be controlled. By carrying out the heat treatment in the closed vessel in this manner, vitreous ceramics having excellent properties, having two types of fine crystals of fluormica and zirconia are uniformly dispersed in the glass matrix, can be obtained.

As is apparent from the foregoing description, according to the process of the present invention, the serious defect of the conventional technique, that is, formation of cracks in the process of preparing a large vitreous body, can be overcome and the yield can be increased. Moreover, both the mechanical strength and machinability can be improved.

The present invention will now be described in detail with reference to the following examples which by no means limit the scope of the invention.

EXAMPLE 1

The starting compositions shown in Table 3 were prepared by using refined pottery stone having a chemical composition shown in Table 1, magnesium fluoride, magnesium oxide, potassium carbonate, boric acid and lithium zirconate, potassium zirconate, calcium zirconate, barium zirconate, lead zirconate or refined zircon having a chemical composition shown in Table 2 as the zirconium-containing complex oxide, or zirconia alone or a mixture of zirconia with calcium oxide, silica or alumina instead of the zirconium-containing complex oxide.

TABLE 1

| Component | Content (% by weight) |
|---|---|
| ignition loss | 3.41 |
| $SiO_2$ | 66.86 |
| $Al_2O_3$ | 23.21 |
| $K_2O$ | 5.55 |
| impurities | 0.97 |

TABLE 2

| Component | Content (% by weight) |
|---|---|
| ignition loss | 0.46 |
| $ZrSiO_4$ | 97.70 |
| impurities | 1.84 |

In each example, the starting material was sufficiently blended for 1 hour in a ball mill and was charged in a high temperature furnace and melted at 1450° C. The melt was cast in a square graphite mold having a size of 25 cm×25cm×4 cm. Then, the melt was gradually cooled from 750° C. to 500° C. over a period of 5 hours and was then allowed to cool to room temperature to obtain a vitreous body.

The glass transition temperature and crack ratio of the vitreous body were examined. The obtained results are shown in Table 3.

The so-obtained vitreous body and a crucible charged with magnesium fluoride were placed in a vessel formed of alumina, and a lid formed of alumina was attached to the vessel and the vessel was placed in an electric furnace. The temperature was elevated to 1150° C. over a period of 4 hours and this temperature was maintained for 3 hours, and the vessel was gradually cooled.

With respect to the obtained vitreous ceramics, the flexural strength and compression strength were measured and the machinability was tested by using a high-speed lathe. The obtained results are shown in Table 3.

TABLE 3

| Experiment | A | B | C | D | E | F | G[1] | H[1] | I[1] | J[1] | K[2] |
|---|---|---|---|---|---|---|---|---|---|---|---|
| Starting composition | | | | | | | | | | | |
| Pottery stone | 53.2 | 60.3 | 62.6 | 57.5 | 59.2 | 52.8 | 60.2 | 62.4 | 62.0 | 61.0 | — |
| $MgF_2$ | 12.6 | 9.1 | 5.3 | 6.6 | 6.9 | 6.0 | 7.6 | 5.2 | 10.0 | 8.4 | 7.4 |
| MgO | 12.1 | 8.8 | 6.7 | 13.4 | 7.5 | 13.1 | 8.8 | 7.0 | 10.2 | 11.2 | 12.8 |
| $K_2CO_3$ | 10.4 | 6.2 | 7.5 | 9.0 | 7.7 | 9.2 | 9.7 | 7.3 | 7.3 | 8.2 | 9.0 |
| $H_3BO_3$ | 6.6 | 11.9 | 9.7 | 7.8 | 10.2 | 13.5 | 10.3 | 9.8 | 5.2 | 11.2 | 7.1 |
| $Li_2O.ZrO_2$ | 5.1 | — | — | — | — | — | — | — | — | — | — |
| $K_2O.ZrO_2$ | — | 3.7 | — | — | — | — | — | — | — | — | — |
| $CaO.ZrO_2$ | — | — | 8.2 | — | — | — | — | — | — | — | — |
| $BaO.ZrO_2$ | — | — | — | 5.7 | — | — | — | — | — | — | — |
| $PbO.ZrO_2$ | — | — | — | — | 8.5 | — | — | — | — | — | — |
| $SiO_2.ZrO_2$ | — | — | — | — | — | 5.4 | — | — | — | — | — |
| $ZrO_2$ | — | — | — | — | — | — | 3.4 | 5.6 | 0.3 | — | 4.2 |
| CaO | — | — | — | — | — | — | — | 2.7 | — | — | — |
| $SiO_2$ | — | — | — | — | — | — | — | — | 5.0 | — | 43.8 |
| $Al_2O_3$ | — | — | — | — | — | — | — | — | — | — | 15.7 |
| Contents | | | | | | | | | | | |
| Si | 18.0 | 20.7 | 21.5 | 19.6 | 20.3 | 19.4 | 20.8 | 21.4 | 23.2 | 21.1 | 20.5 |
| Al | 7.1 | 8.1 | 8.4 | 7.6 | 7.9 | 7.3 | 8.2 | 8.4 | 8.1 | 8.3 | 8.3 |
| Mg | 13.3 | 9.7 | 6.7 | 11.7 | 7.9 | 11.4 | 9.2 | 6.8 | 10.8 | 11.2 | 10.6 |
| K | 9.1 | 8.4 | 7.8 | 8.5 | 7.7 | 8.5 | 9.2 | 7.8 | 7.6 | 8.2 | 7.5 |
| B | 1.2 | 2.3 | 1.9 | 1.5 | 2.0 | 2.7 | 2.0 | 1.9 | 1.0 | 2.2 | 2.2 |
| Zr | 3.3 | 1.8 | 4.5 | 2.1 | 2.4 | 2.9 | 2.8 | 4.5 | 0.2 | — | 3.1 |
| F | 8.4 | 6.2 | 3.5 | 4.4 | 4.6 | 4.1 | 5.1 | 3.5 | 6.5 | 5.6 | 4.5 |
| O | 38.6 | 42.1 | 42.9 | 40.7 | 40.9 | 43.0 | 42.0 | 42.9 | 42.0 | 42.7 | 43.3 |
| Others | 1.0 | 0.7 | 2.8 | 3.9 | 6.3 | 0.7 | 0.7 | 2.8 | 0.6 | 0.3 | — |
| Test Results | | | | | | | | | | | |
| Glass transition temperature (°C.)[3] | 640 | 630 | 640 | 640 | 650 | 630 | 640 | 630 | 640 | 640 | 640 |
| Crack ratio[4] | 1/8 | 1/12 | 1/10 | 1/8 | 1/9 | 1/8 | 3/7 | 2/7 | 4/7 | 3/7 | 3/9 |
| Flexural Strength ($Kgf/cm^2$) | 1200 | 1250 | 1250 | 1150 | 1150 | 1230 | 1000 | 1050 | 980 | 1210 | 1050 |
| Compression Strength ($Kgf/cm^2$) | 5400 | 5050 | 5350 | 5100 | 4900 | 4830 | 4450 | 4200 | 4200 | 4220 | 3500 |
| Machinability[5] | 1 | 1 | 1 | 1-2 | 1 | 2 | 2-3 | 5 | 1 | 1 | 2-3 |

Note
[1] comparative example
[2] comparative example (according to the process disclosed in Japanese publication No. 34775/79) (amounts of $K_2O$ and $B_2O_3$ are shown instead of those of $K_2CO_3$ and $H_3BO_3$)
[3] determined by the specific heat measurements (the error is within ± 10° C.)
[4] when formation of a vitreous body having an area of 25 cm × 25 cm was tried, if a vitreous body having an area of at least 20 cm × at least 20 cm could not be obtained because of cracking, the body was judged as "crack". The ratio of the number of "crack" bodies to the total number was shown as the crack ratio.
[5] A product formed into a column was machined by using a lathe equipped with a cemented carbide tool (Ktype) and the wearing of the tool was observed by a microscope and evaluated in five grades (1: good → 5: bad).

EXAMPLE 2

The starting compositions shown in Table 4 were prepared in the same manner as described in Example 1 except for the amount of the zirconium-containing complex oxide used. The compositions were melted and heat treated to obtain vitreous ceramics in the same manner as described in Example 1. The obtained vitreous body and vitreous ceramics were evaluated. The obtained results are shown in Table 4.

TABLE 4

| Experiment | C | L[1] | M | F | N | O | P[1] |
|---|---|---|---|---|---|---|---|
| Starting Composition | | | | | | | |
| Pottery Stone | 62.6 | 63.3 | 63.3 | 52.8 | 58.0 | 58.8 | 57.7 |
| $MgF_2$ | 5.3 | 8.1 | 10.0 | 6.0 | 8.0 | 8.1 | 6.0 |
| MgO | 6.7 | 7.9 | 6.0 | 13.1 | 10.5 | 11.6 | 11.5 |
| $K_2CO_3$ | 7.5 | 9.3 | 6.5 | 9.2 | 7.8 | 7.8 | 9.1 |
| $H_3BO_3$ | 9.7 | 10.4 | 6.2 | 13.5 | 10.7 | 10.8 | 11.2 |
| $CaO.ZrO_2$ | 8.2 | 1.0 | — | — | — | — | — |
| $SiO_2.ZrO_2$ | — | — | 8.0 | 5.4 | 5.0 | 2.9 | — |
| $SiO_2$ | — | — | — | — | — | — | 4.5 |
| Contents | | | | | | | |
| Si | 21.5 | 21.9 | 22.6 | 19.4 | 20.7 | 20.7 | 22.3 |
| Al | 8.4 | 8.6 | 8.4 | 7.3 | 7.8 | 7.9 | 7.9 |
| Mg | 6.7 | 8.9 | 8.1 | 11.4 | 10.3 | 11.2 | 10.2 |
| K | 7.8 | 9.0 | 7.1 | 8.5 | 7.8 | 7.8 | 8.6 |
| B | 1.9 | 2.0 | 1.2 | 2.7 | 2.1 | 2.1 | 2.2 |
| Zr | 4.5 | 0.5 | 4.2 | 2.9 | 2.6 | 1.5 | — |
| F | 3.5 | 5.4 | 6.6 | 4.1 | 5.4 | 5.4 | 4.1 |
| O | 42.9 | 42.8 | 41.0 | 43.0 | 42.5 | 42.6 | 44.0 |
| Others | 2.8 | 0.9 | 0.8 | 0.7 | 0.8 | 0.8 | 0.7 |
| Results | | | | | | | |
| Glass transition temperature(°C.)[3] | 640 | 630 | 630 | 630 | 630 | 620 | 620 |
| crack ratio[4] | 1/10 | 2/5 | 1/7 | 1/8 | 2/10 | 2/8 | 4/9 |
| flexural strength($Kgf/cm^2$) | 1250 | 1100 | 1050 | 1230 | 1250 | 1710 | 1160 |
| compression strength($Kgf/cm^2$) | 5350 | 4600 | 4320 | 4830 | 4920 | 5710 | 4750 |

TABLE 4-continued

| Experiment | C | L[1] | M | F | N | O | P[1] |
|---|---|---|---|---|---|---|---|
| machinability[5] | 1 | 2 | 1 | 2 | 2 | 2 | 4 |

Note
[1] comparative example
[3] evaluated as in TABLE 3
[4] evaluated as in TABLE 3
[5] evaluated as in TABLE 3

EXAMPLE 3

Melts were prepared according to the sample B or C in Example 1 and vitreous ceramics were prepared in the same manner as described in Example 1 except that the vitrefying and heat treating conditions were changed as shown in Table 5. The flexural strength, compression strength and machinability of the obtained product were determined. The obtained results are shown in Table 5.

TABLE 5

| Experiment: | Q | R | S[1] | T | U[1] |
|---|---|---|---|---|---|
| Starting Composition: | B | B | B | C | C |
| Formation of Vitreous Body: | | | | | |
| cooling speed (°C./hr) | 70 | 90 | 120 | 60 | 60 |
| crack ratio[4] | 0/5 | 1/7 | 3/3 | 0/5 | 0/4 |
| Crystallization: | | | | | |
| heat treatment | | | | | |
| temperature (°C.) | 1170 | 1190 | — | 1150 | 1000 |
| retention time (hrs) | 4 | 3 | — | 4 | 10 |
| flexural strength | | | | | |
| (Kg f/cm²) | 1300 | 1250 | — | 1250 | 1450 |
| compression | 5250 | 5200 | — | 5300 | 5800 |
| strength (Kg f/cm²) | | | | | |
| machinability[5] | 1 | 1 | — | 1 | 4 |

Note
[1] comparative example
[4] determined in the same manner as in Table 3
[5] determined in the same manner as in Table 3

EXAMPLE 4

Melts were prepared according to the sample F in Example 1 or the sample 0 in Example 2, and vitreous ceramics were prepared in the same manner as described in Example 1 except that the vitrefying and heat treating conditions were changed as shown in Table 6. The flexural strength, compression strength and machinability of the obtained product were determined. The obtained results are shown in Table 6.

TABLE 6

| Experiment: | V | W[1] | X | Y | Z[1] |
|---|---|---|---|---|---|
| Starting Composition: | F | F | O | O | O |
| Formation of Vitreous Body: | | | | | |
| cooling speed (°C./hr) | 60 | 60 | 60 | 90 | 120 |
| crack ratio[4] | 1/6 | 0/4 | 0/4 | 2/6 | 4/4 |
| Crystallization: | | | | | |
| heat treatment | 1150 | 1000 | 1150 | 1180 | — |
| temperature (° C.) | | | | | |
| retention time (hrs) | 3 | 10 | 4 | 4 | — |
| flexural strength | 1250 | 1640 | 1680 | 1700 | — |
| (Kg f/cm²) | | | | | |
| compression | 4900 | 5620 | 5650 | 5680 | — |
| strength (Kg f/cm²) | | | | | |
| machinability[5] | 2 | 4 | 2 | 2 | — |

Note
[1] comparative example
[4] determined in the same manner as in Table 3
[5] determined in the same manner as in Table 3

As is apparent from the foregoing description, according to the process of the present invention for the production of vitreous ceramics, a vitreous body is prepared under specific conditions and then the vitreous body is heat treated under specific conditions. When a large vitreous body is prepared, the crack ratio is drastically reduced, and a large product having improved mechanical strength and machinability and having a high homogeneity can be obtained in a high yield.

What is claimed is:

1. A high yield method of producing a vitreous ceramic body of improved machinability and mechanical strength and substantially reduced cracks, comprising
   mixing pottery stone, magnesium fluoride, a magnesium oxide precursor, a potassium oxide precursor, a boron oxide precursor and a complex oxide comprising zirconium dioxide and an oxide of at least one metal selected from the group consisting of alkali metals, alkaline earth metals, silicon and lead in amounts effective to obtain a composition of matter consisting essentially of 16 to 25 wt % silicon, 6 to 9 wt % aluminum, 5.5 to 12 wt % potassium, 4.7 to 15 wt % magnesium, 0.7 to 5.0 wt % zirconium, 0.7 to 3.2 wt % boron, 3.0 to 9.3 wt % fluorine and up to 7.0 wt % of other metals, the balance being oxygen, exclusive of the ignition loss;
   heat-melting the composition;
   gradually cooling the heat-melted composition from a temperature higher by at least 50° C. than the glass transition temperature thereof to a temperature lower by at least 70° C. than said transition temperature at a rate lower than 100° C./hour while forming a solid vitreous body; and
   heating the vitreous body at a temperature of 1100° to 1260° C. in a covered vessel for a period of time effective to obtain said vitreous ceramic body.

2. The method of claim 1, wherein
   the heating of the vitreous body is conducted at a temperature of 1150° C. or greater.

3. The method of claim 1, wherein
   the heat-melted composition is cooled at a rate of 90° C./hr or less.

4. The method of claim 1, wherein
   the complex oxide comprises calcium oxide and zirconium dioxide.

5. The method of claim 1, wherein
   the complex oxide comprises SiO₂ and zirconium dioxide.

6. The method of claim 1, wherein
   the complex oxide comprises lithium oxide and zirconium dioxide.

7. The method of claim 1, wherein
   the complex oxide comprises barium oxide and zirconium dioxide.

8. The method of claim 1, wherein
   the complex oxide comprises lead oxide and zirconium dioxide.

9. The method of claim 1, wherein
   the complex oxide comprises potassium oxide and zirconium dioxide.

10. A method for reducing cracks during the manufacture of a vitreous ceramic body of high mechanical strength and machinability characteristics, comprising
    mixing pottery stone, magnesium fluoride, a magnesium oxide precursor, a potassium oxide precursor, a boron oxide precursor and a complex oxide comprising zirconium dioxide and an oxide of at least one metal selected from the group consisting of alkali metals, alkaline earth metals, silicon and lead in amounts effective to obtain a composition of matter consisting essentially of 16 to 25 wt % silicon, 6 to 9 wt % aluminum, 5.5 to 12 wt % potassium, 4.7 to 15 wt % magnesium, 0.7 to 5.0 wt % zirconium, 0.7 to 3.2 wt % boron, 3.0 to 9.3 wt % fluorine and up to 7.0 wt % of other metals, the balance being oxygen, exclusive of the ignition loss;

heat-melting the composition;

gradually cooling the heat-melted composition from a temperature higher by at least 50° C. than the glass transition temperature thereof to a temperature lower by at least 70° C. than said transition temperature at a rate lower than 100° C./hour while forming a solid vitreous body; and heating the vitreous body at a temperature of 1100° to 1360° C. in a covered vessel for a period of time effective to obtain said vitreous ceramic body.

11. The method of claim 10, wherein
the complex oxide comprises zirconium dioxide and an oxide selected from the group consisting of $SiO_2$, lead oxide, potassium oxide, barium oxide, calcium oxide and lithium oxide.

12. The method of claim 10, wherein
the heating of the vitreous body is conducted at a temperature of 1150° C. or greater.

13. The method of claim 10, wherein
the heat-melted composition is cooled at a rage of 90° C./hr or less.

14. A method of improving the mechanical strength of a large vitreous ceramic body comprising
mixing pottery stone, magnesium fluoride, a magnesium oxide precursor, a potassium oxide precursor, a boron oxide precursor and a complex oxide comprising zirconium dioxide and an oxide of at least one metal selected from the group consisting of alkali metals, alkaline earth metals, silicon and lead in amounts effective to obtain a composition of matter consisting essentially of 16 to 25 wt % silicon, 6 to 9 wt % aluminum, 5.5 to 12 wt % potassium, 4.7 to 15 wt % magnesium, 0.7 to 5.0 wt % zirconium, 0.7 to 3.2 wt % boron, 3.0 to 9.3 wt % fluorine and up to 7.0 wt % of other metals, the balance being oxygen, exclusive of the ignition loss;

heat-melting the composition;

gradually cooling the heat-melted composition from a temperature higher by at least 50° C. than the glass transition temperature thereof to a temperature lower by at least 70° C. than said transition temperature at a rate lower than 100° C./hour while forming a solid vitreous body; and heating the vitreous body at a temperature of 1100° to 1360° C. in a covered vessel for a period of time effective to obtain said vitreous ceramic body.

15. The method of claim 14, wherein
the complex dioxide comprises zirconium dioxide and an oxide selected from the group consisting of $SiO_2$, lead oxide, potassium oxide, barium oxide, calcium oxide and lithium oxide.

16. The method of claim 14, wherein
the heating of the vitreous body is conducted at a temperature of 1150° C. or greater.

17. The method of claim 14, wherein
the heat-melted composition is cooled at a rate of 90° C./hr or less.

* * * * *